(12) United States Patent
Hwang et al.

(10) Patent No.: US 11,554,506 B2
(45) Date of Patent: Jan. 17, 2023

(54) DEVICE AND METHOD FOR MEASURING REPEATED POSITIONING PRECISION OF ROBOTIC ARM

(71) Applicant: NATIONAL CHUNG SHAN INSTITUTE OF SCIENCE AND TECHNOLOGY, Taoyuan (TW)

(72) Inventors: Yi-Yuh Hwang, Taipei (TW); Li-Chung Liu, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 178 days.

(21) Appl. No.: 17/219,851

(22) Filed: Mar. 31, 2021

(65) Prior Publication Data

US 2022/0314468 A1 Oct. 6, 2022

(51) Int. Cl.
  *B25J 19/02* (2006.01)
  *B25J 9/16* (2006.01)
  *B25J 13/08* (2006.01)

(52) U.S. Cl.
  CPC .......... *B25J 19/022* (2013.01); *B25J 9/1692* (2013.01); *B25J 13/088* (2013.01)

(58) Field of Classification Search
  CPC ...... B25J 19/022; B25J 9/1692; B25J 13/088; B25J 13/089; B25J 9/1653; G05B 2219/34225; G05B 2219/37275; G05B 2219/37287; G05B 2219/37288; G05B 2219/37571; G05B 2219/39033; G05B 2219/40588; G05B 2219/40623; G05B 2219/37067; G05B 2219/37069;
  (Continued)

(56) References Cited

U.S. PATENT DOCUMENTS

| 6,205,839 B1 * | 3/2001 | Brog.ang.rdh ....... B25J 19/0041 318/568.22 |
| 7,715,016 B2 | 5/2010 | Hwang et al. |
| 10,207,410 B1 * | 2/2019 | Shnitser ................ G01S 7/4916 |

(Continued)

FOREIGN PATENT DOCUMENTS

| JP | 2019120967 A | 7/2019 |
| TW | I340910 B | 4/2011 |
| TW | I646305 B | 1/2019 |

*Primary Examiner* — Abby Y Lin
*Assistant Examiner* — Esvinder Singh (57) ABSTRACT

A device for measuring repeated positioning precision of a robotic arm is introduced. Using an optical speckle three-dimensional displacement sensor developed by the inventor, and with collaboration of an optical speckle image three-dimensional positioning base built with an optical speckle coordinate database and having low thermal expansion, an optical speckle three-dimensional absolute positioning space is established. The optical speckle three-dimensional displacement sensor is installed on an end effector of a robotic arm, the robotic arm is moved to have the optical speckle three-dimensional displacement sensor enter an optical speckle three-dimensional absolute positioning space, an optical speckle image of a positioning point is captured and compared with a coordinate optical speckle image in the optical speckle coordinate database, and current three-dimensional absolute positioning coordinates of the end effector of the robotic arm can be obtained.

10 Claims, 6 Drawing Sheets

(58) Field of Classification Search
CPC .......... G05B 2219/39024; G05B 2219/39026; G05B 2219/39041
See application file for complete search history.

(56) References Cited

U.S. PATENT DOCUMENTS

| | | |
|---|---|---|
| 10,632,622 B2 | 4/2020 | Hwang et al. |
| 2015/0266183 A1* | 9/2015 | Alifragkis .............. B25J 9/1692 700/254 |
| 2018/0257234 A1* | 9/2018 | Shimazu ................ B25J 9/1697 |

* cited by examiner

DEVICE AND METHOD FOR MEASURING REPEATED POSITIONING PRECISION OF ROBOTIC ARM

BACKGROUND OF THE INVENTION

1. Field of the Invention

The present disclosure relates to a device and a method for measuring repeated positioning precision of a robotic arm, and in particular to a device and a method capable of measuring precision of single-point repeated positioning of a robotic arm as well as precision of a motion track of repeated positioning of a robotic arm in an optical speckle three-dimensional absolute positioning space.

2. Description of the Related Art

Substituting robots for human labor has become a trend. Tractica has estimated that the market value of global robot revenue will go beyond USD 100 billion for the first time in the year 2020, and will even reach as high as USD 500 billion in the year 2025. That is, in the next six years, the revenue of the global robotic industry will grow for more than 500%, and the influence of robots on the human life is ever-increasing. Main technical parameters of robots generally include the seven parameters below: degree of freedom, resolution, precision, repeated position precision, operating range, payload and maximum speed. When it comes to the precision of robots, industrialists usually first consider whether the repeated positioning precision of the robots satisfies application needs, and repetition of position is the sole positioning performance index specified by manufacturers of industrial robots.

A conventional method for measuring repeated positioning precision of a robotic arm includes the use of a laser tracker, the use of a three-axis laser displacement sensor and the use of a three-dimensional probe. The measurement principle of a laser tracker involves the use of a retro-reflecting mirror and a laser head. When the laser head emits laser light, the laser light is reflected in parallel by the retro-reflecting mirror and returns to the laser head, and the tracker then calculates a distance using a time difference between the emission and reception (ADM mode), or measures a distance between the laser head and the retro-reflecting mirror by using interference of laser light (IFM mode). Then, the three-dimensional position coordinates of the retro-reflecting mirror are calculated from the horizontal angle and pitch angle parameters of the laser head and the distance parameter. When the laser tracker is applied to positioning of a robotic arm, the retro-reflecting mirror is adhered to an end effector of the robotic arm so as to measure at all times the three-dimensional position of the end effector. The prior art discloses three laser displacement sensors configured perpendicular to one another in space, which is analogous to a three-dimensional coordinate system. During measurement, the robotic arm is controlled to reach the test center ranges of the three laser displacement sensors to ensure that the three rays of light are projected to the end effector of the robotic arm, and the position of the end effector of the robotic arm with respect to the three axes in space can then be obtained on the basis of the principle of laser diffuse reflection.

The laser tracker has three drawbacks when applied in the verification for the positioning precision of a robotic arm. First of all, a laser tracker has poor positioning precision, which aggravates as the tracking distance increases. The positioning precision performance depends on the manufacturer brand, and is in general, approximately 25 μm at a distance of 5 m, and approximately 80 μm at a distance of 80 m. Secondly, the tracking positioning speed of a laser tracker is slow, and so the moving speed of a robotic arm is limited. Thirdly, a corresponding measurement calibration system is more costly.

Regardless of the use of a three-dimensional laser displacement meter or a three-dimensional contact probe to measure positioning precision of a robotic arm, measurement points in the three directions are not the same point; position coordinates of the measurement points can be obtained only by calculation, and such approach of indirect measurement affects the positioning precision. Moreover, measurement can be performed only within a predetermined range, and measurement devices perpendicular to one another have to be re-established for different positions, resulting in complications.

Therefore, in view of the above, the inventor aims at improving the drawbacks of the conventional method for measuring repeated positioning precision of a robotic arm according to years of abundant experience in design, development and actual manufacturing in the related industries, and provides a device and a method for measuring repeated positioning precision of a robotic arm, so as to achieve an object of better practicability.

BRIEF SUMMARY OF THE INVENTION

In view of the drawbacks of the prior art above, it is a primary object of the present invention to provide a device and a method for measuring repeated positioning precision of a robotic arm. The device and the method have a simple structure, are capable of performing calibration of infinite numbers of multiple positions and multiple orientations, and provide each three-dimensional axis with absolute positioning precision of less than 0.1 μm, a fast positioning speed and a cost-effective overall calibration module.

To achieve the objects above, a device for measuring repeated positioning precision of a robotic arm is provided according to a solution of the present invention. The device includes: an optical speckle three-dimensional displacement sensor, having two image invariant optical speckle capturing devices perpendicular to each other and a laser displacement sensor; a two-dimensional laser interferometer calibration platform, having an optical speckle image three-dimensional positioning base and the optical speckle three-dimensional displacement sensor, the optical speckle three-dimensional displacement sensor configured to emit three laser beams striking on a same position of the optical speckle image three-dimensional positioning base so as to capture two optical speckle images and a height value of the position, and to build, from the two optical speckle images and the height value respectively corresponding to a plurality of positions of the optical speckle image three-dimensional positioning base stricken by the three laser beams of the optical speckle three-dimensional displacement sensor, an optical speckle coordinate database having two coordinate optical speckle images and a set of three-dimensional positioning coordinates; a robotic arm repeated positioning precision test platform, formed by three of the optical speckle image three-dimensional positioning bases perpendicular to one another, wherein each of the optical speckle image three-dimensional positioning bases is built with the optical speckle coordinate database; and a robotic arm, including an end effector, the end effector installed with the optical speckle three-dimensional displacement sensor. The robotic arm is moved to have the optical speckle three-dimensional displacement sensor enter an optical speckle three-dimensional absolute positioning space of the robotic arm repeated positioning precision test platform to capture an optical speckle image of a positioning point. The optical speckle image is compared with the coordinate optical speckle image in the optical speckle coordinate database to obtain X-axis and the Y-axis relative displacement amounts of the positioning point relative to the coordinate optical speckle image. Further, in collaboration with a Z-axis height parameter of the optical speckle three-dimensional displacement sensor and the three-dimensional positioning coordinates of the coordinate optical speckle image, current three-dimensional absolute positioning coordinates of the end effector of the robotic arm can be obtained.

Preferably, each of the image invariant optical speckle capturing devices includes an X-axis displacement sensor and a Y-axis displacement sensor. The X-axis displacement sensor measures the displacement amount in the X-axis direction for any point of an object surface, and the Y-axis displacement sensor measures the displacement amount in the Y-axis direction for any point of an object surface.

Preferably, the laser displacement sensor is a Z-axis displacement sensor, and may include a laser confocal displacement sensor, a color confocal displacement sensor, a white light interference displacement sensor, or a triangular measurement laser displacement sensor.

Preferably, all detection laser beams of the X-axis displacement sensor, the Y-axis displacement sensor and the Z-axis displacement sensor strike on the same point on a surface of the optical speckle image three-dimensional positioning base, operating wavelengths of the individual laser beams differ by at least 10 nm, and a ±5 nm interferometric filter is placed in front of a receiving lens of each of the displacement sensors to filter out scattered light of the remaining two laser beams so that the three laser beams do not interfere one another.

Preferably, the optical speckle three-dimensional absolute positioning space is above the optical speckle image three-dimensional positioning base, and is the three-dimensional space within a measurement height of the optical speckle three-dimensional displacement sensor.

Preferably, the optical speckle three-dimensional displacement sensor continuously captures images at a frequency of more than 10 kHz.

To achieve the objects above, a method for measuring repeated positioning precision of a robotic arm is provided according to a solution of the present invention. The method includes steps of: (A) establishing a two-dimensional laser interferometer calibration platform, emitting three laser beams by an optical speckle three-dimensional displacement sensor to strike on a same position of an optical speckle image three-dimensional positioning base to capture two optical speckle images and a height value of the position, and building, from the two optical speckle images and the height value respectively corresponding to a plurality of positions of the optical speckle image three-dimensional positioning base stricken by the three laser beams of the optical speckle three-dimensional displacement sensor, an optical speckle coordinate database having two coordinate optical speckle images and a set of three-dimensional positioning coordinates; (B) establishing a robotic arm repeated positioning precision test platform by means of forming the robotic arm repeated positioning precision test platform by three optical speckle image three-dimensional positioning bases perpendicular to one another, wherein each of the optical speckle image three-dimensional positioning bases is built with the optical speckle coordinate database; (C) installing the optical speckle three-dimensional displacement sensor on an end effector of the robotic arm; and (D) moving the robotic arm to have the optical speckle three-dimensional displacement sensor enter an optical speckle three-dimensional absolute positioning space of the robotic arm repeated positioning precision test platform to capture an optical speckle image of a positioning point, comparing the optical speckle image with the coordinate optical speckle image in the optical speckle coordinate database to obtain the X-axis and the Y-axis relative displacement amounts of the positioning point relative to the coordinate optical speckle image, and further in conjunction with a Z-axis height parameter of the optical speckle three-dimensional displacement sensor and the three-dimensional positioning coordinates of the coordinate optical speckle image, obtaining current three-dimensional absolute positioning coordinates of the end effector of the robotic arm.

The summary above and the detailed description and attached drawings below are for further understanding the approaches and means used for achieving the expected effects and objects of the present invention. Other objects and advantages of the present invention are to be described with the accompanying drawings below.

DETAILED DESCRIPTION OF THE INVENTION

To facilitate understanding of the object, characteristics and effects of this present disclosure, embodiments together with the attached drawings for the detailed description of the present disclosure are provided.

Refer to FIG. 1 to FIG. 9. The present invention provides a device for measuring repeated positioning precision of a robotic arm. Using an optical speckle three-dimensional displacement sensor 2 developed by the inventor and further in conjunction with an optical speckle image three-dimensional positioning base 1 having low thermal expansion and built with an optical speckle coordinate database, an optical speckle three-dimensional absolute positioning space is established. The optical speckle three-dimensional displacement sensor 2 is installed on a robotic arm end effector 21, a robotic arm 20 is moved to have the optical speckle three-dimensional displacement sensor 2 enter the optical speckle three-dimensional absolute positioning space of the optical speckle image three-dimensional positioning base 1, optical speckle images and height values of positioning points 9, 10 and 11 are captured, and the optical speckle images and the height values obtained in real time are compared with coordinate optical speckle images $O_p$, $I_q)_{X\text{-}axis}$ and $(I_p, I_q)_{Y\text{-}axis}$ in the optical speckle coordinate database, thereby obtaining current three-dimensional absolute positioning coordinates of the robotic arm end effector 21.

More specifically, the device for measuring repeated positioning precision of a robotic arm of the present invention includes the optical speckle three-dimensional displacement sensor 2, a two-dimensional laser interferometer calibration platform, and a robotic arm repeated positioning precision test platform.

Figure 1:
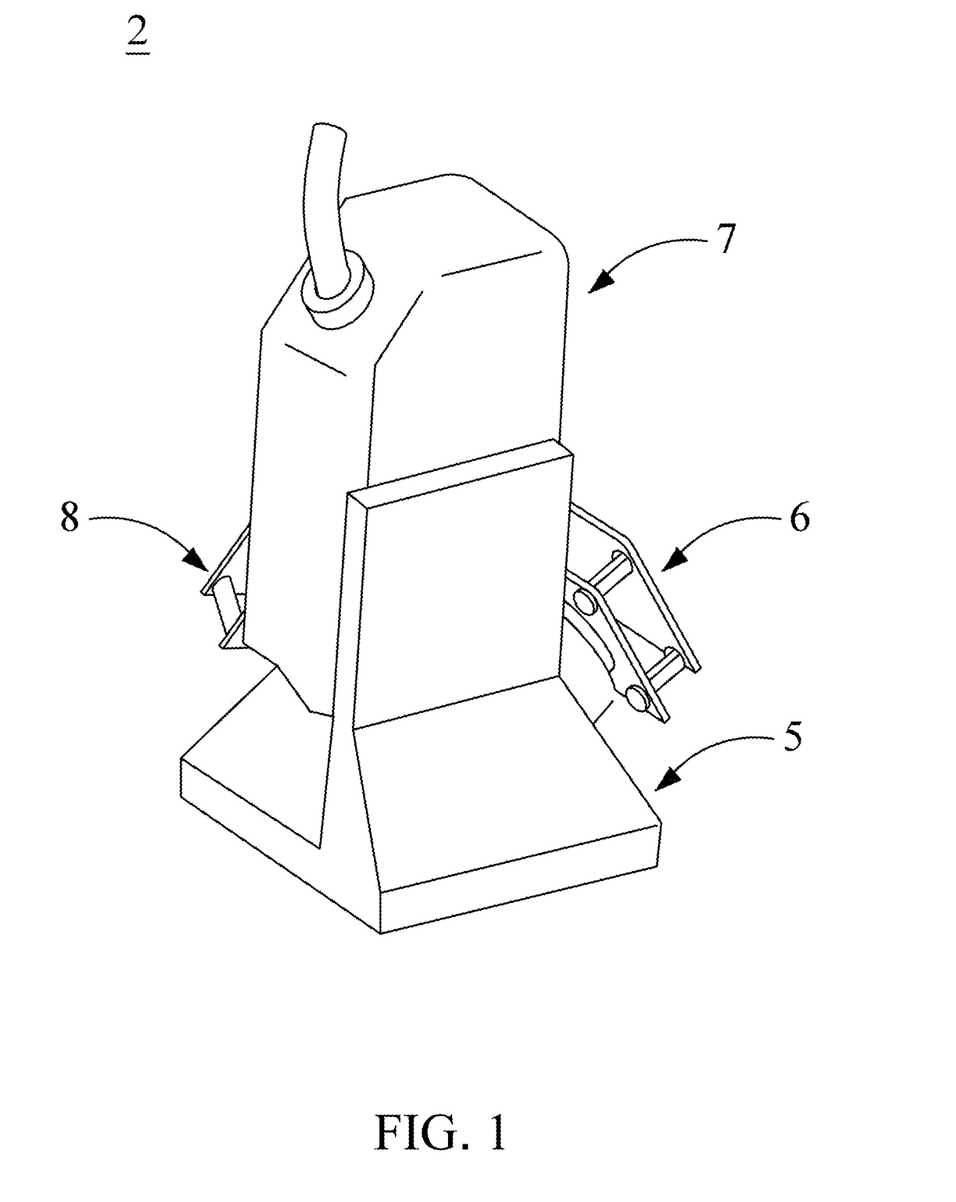
FIG. 1 is a structural schematic diagram of an optical speckle three-dimensional displacement sensor of the present invention.

The optical speckle three-dimensional displacement sensor 2 has two image invariant optical speckle capturing devices perpendicular to each other and a laser displacement sensor. Associated details can be referred to the image invariant optical speckle capturing device and method disclosed by the Taiwan Patent No. 1340,910 and U.S. Pat. No. 7,715,016 B2 of the applicant of the present application. The optical speckle three-dimensional displacement sensor 2 is constructed by two image invariant optical speckle capturing devices and one laser displacement sensor. Referring to FIG. 1, two image invariant optical speckle capturing devices perpendicular to each other, i.e., an X-axis displacement sensor 8 and a Y-axis displacement sensor 6 respectively, are installed on a three-dimensional displacement sensor base 5 to measure displacement amounts in the X-axis direction and the Y-axis direction for any point on an object surface. A Z-axis displacement sensor 7 capable of precisely measuring the Z-axis direction is installed right above the three-dimensional displacement sensor 5, and the Z-axis displacement sensor 7 may be a laser confocal displacement sensor, a color confocal displacement sensor, a white light interference displacement sensor or a triangular measurement laser displacement sensor. All detection laser beams of the X-axis displacement sensor 8, the Y-axis displacement sensor 6 and the Z-axis displacement sensor 7 strike on the same point of an object surface, operating wavelengths of the individual laser beams differ by at least 10 nm, and a ±5 nm interferometric filter is placed in front of a receiving lens of each of the displacement sensors to filter out scattered light of the remaining two laser beams so that the three laser beams do not interfere one another.

Figure 2:
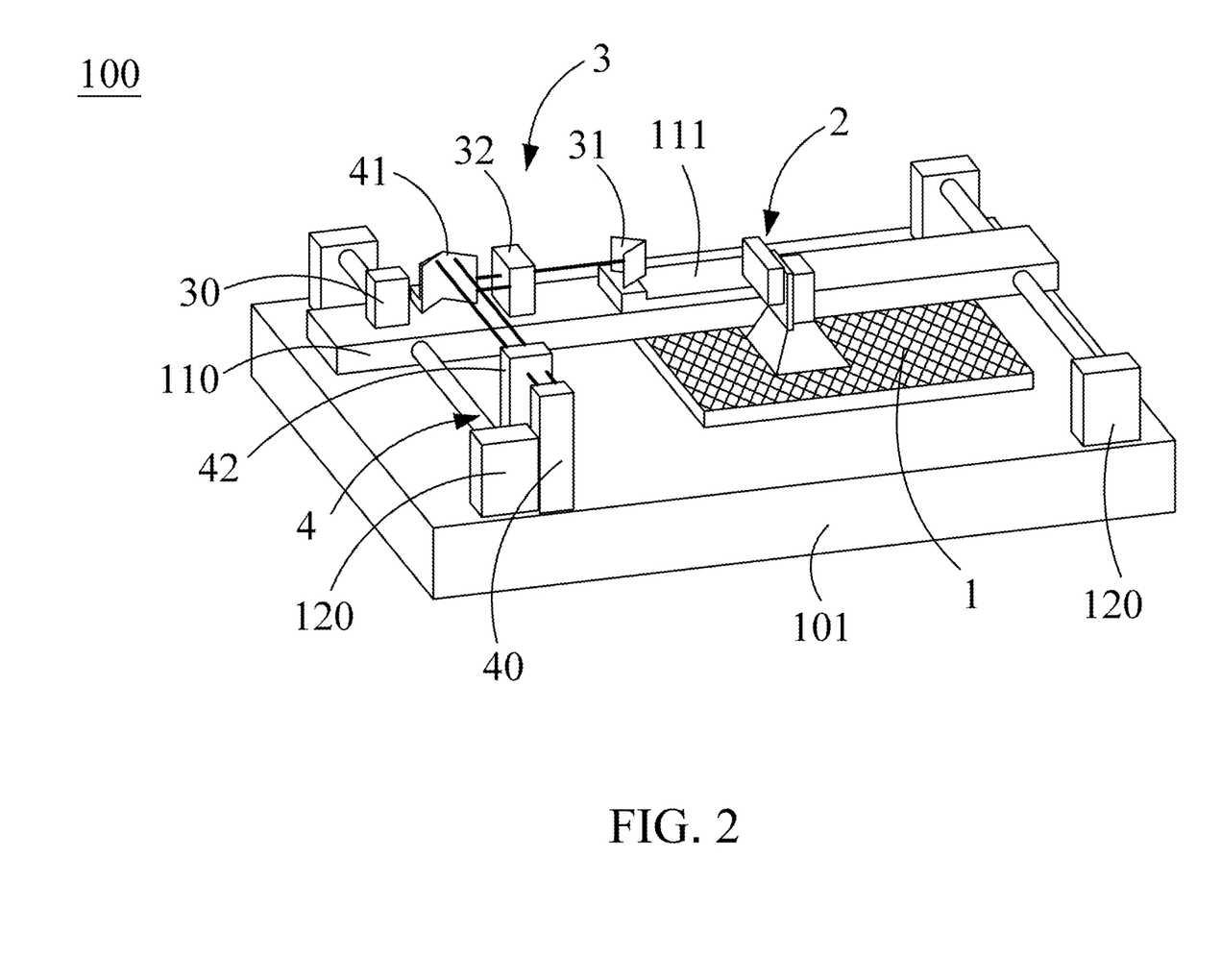
FIG. 2 is a structural schematic diagram of a two-dimensional laser interferometer calibration platform of the present invention.

On the two-dimensional laser interferometer calibration platform 100, the optical speckle image three-dimensional positioning base 1 having high rigidity and low thermal expansion, an X-axis laser interferometer 3, a Y-axis laser interferometer 4, an X-axis shifting platform 110, a Y-axis shifting platform 120 and the optical speckle three-dimensional displacement sensor 2 are installed on an optical deck 101. In order to obtain accurate optical speckle image displacement measurement values that do not change with the ambient temperature, the optical speckle image three-dimensional positioning base 1 having a low thermal expansion coefficient (insusceptible to change in length) and a high hardness coefficient (insusceptible to deformation) is needed to build an optical speckle coordinate database. Such positioning base insusceptible to deformation and change in length may be a granite positioning base, a zero-expansion glass positioning base, or a zero-expansion ceramic plate positioning base. Referring to FIG. 1 and FIG. 2, the X-axis shifting platform 110 is installed on the Y-axis shifting platform 120 and the two are perpendicular to each other—such configuration is equivalent to using the X-axis shifting platform 110 as a sliding block of the Y-axis shifting platform 120. The X-axis laser interferometer 3 includes a laser emitting/receiving head 30, an interfering mirror 32 and a retro-reflecting mirror 31. The laser emitting/receiving head 30 and the interfering mirror 32 are installed on one side of the X-axis shifting platform 110, and the retro-reflecting mirror 31 is installed on a sliding block 111 of the X-axis shifting platform 110 so as to adjust the direction of the laser beam. When the sliding block 111 is moved, the laser beam reflected by the retro-reflecting mirror 31 can be stably projected into a receiving hole of the laser emitting/receiving head 30. The Y-axis laser interferometer 4 includes a laser emitting/receiving head 40, an interfering mirror 42 and a retro-reflecting mirror 41. The laser emitting/receiving head 40 and the interfering mirror 42 are installed on one side of the optical deck 101, and the retro-reflecting mirror 41 of the Y-axis laser interferometer 4 is installed on the X-axis shifting platform 110. By adjusting the laser beam of the Y-axis laser interferometer 4 to be perpendicular to the laser beam of the X-axis laser interferometer 3, when the X-axis shifting platform 110 is moved, the laser beam reflected back by the retro-reflecting mirror 41 is stably projected into a receiving hole of the laser emitting/receiving head 40. The optical speckle three-dimensional displacement sensor 2 is installed on the sliding block 111 of the X-axis shifting platform 110. The optical speckle three-dimensional displacement sensor 2 can emit three laser beams striking on the same position of the optical speckle image three-dimensional positioning base 1. By adjusting the height of the optical speckle three-dimensional displacement sensor 2, the X-axis displacement sensor 8 and the Y-axis displacement sensor 6 are able to capture good real-time optical speckle images, and the Z-axis displacement sensor 7 is able to measure a real-time height value of the optical speckle image three-dimensional positioning base 1.

As shown in FIG. 1 to FIG. 4, an optical speckle coordinate database, having the coordinate optical speckle images $(I_n, I_q)_{X\text{-}axis}$ and $(I_n, I_q)_{Y\text{-}axis}$ and a set of three-dimensional positioning coordinates $(x_i, y_j, z_k)$, is built from a plurality of optical speckle images and a plurality of height values measured by the optical speckle image three-dimensional positioning base 1 for a plurality of positions. More specifically, the X-shifting platform 110 and the sliding block 111 of the X-axis shifting platform 110 of the two-dimensional laser interferometer calibration platform 100 are moved, so that the three laser beams emitted by the optical speckle three-dimensional displacement sensor 2 on the sliding block 111 of the X-axis shifting platform 110 strike on the origin of the optical speckle image three-dimensional positioning base 1. The coordinate optical speckle image $(I_n, I_q)_{1, 1\text{-}X\text{-}axis}$ (where p=1-n, and q=1-m) of the X-axis displacement sensor 8, the coordinate optical speckle image $(I_n, I_q)_{1, 1\text{-}Y\text{-}axis}$ (where p=1-n, and q=1-m) of the Y-axis displacement sensor 6, and the height value $(h_{1, 1})$ of the Z-axis displacement sensor 7 at this point in time are recorded; wherein, the coordinate optical speckle image $(I_p, I_q)$ (where p=1-n, and q=1-m) indicates the optical speckle image as an image matrix in an n×m array, the coordinate optical speckle image $(I_p, I_q)_{1,\ 1\text{-}X\text{-}axis}$ indicates an optical speckle image measured by the X-axis displacement sensor 8 at the position (1, 1), and the coordinate optical speckle image $(I_n, I_q)_{1,\ 1\text{-}Y\text{-}axis}$ indicates an optical speckle image measured by the Y-axis displacement sensor 6 at the position (1, 1). The shift outputs of the X-axis laser interferometer 3 and the Y-axis laser interferometer 4 are respectively reset to zero, and so the spatial coordinates of this point are namely $(x_1, y_1, h_{1,\ 1})=(0, 0, h_{1,\ 1})$. Summarizing the measurement results, at the origin of the optical speckle image three-dimensional positioning base 1, the three-dimensional positioning coordinates $(0, 0, h_{1,\ 1})$, the coordinate optical speckle image $(I_p, I_q)_{1,\ 1\text{-}X\text{-}axis}$ (where p=1-n, and q=1-m) of the X-axis displacement sensor 8, and the coordinate optical speckle image $(I_n, I_q)_{1,\ 1\text{-}Y\text{-}axs}$ (where p=1-n, and q=1-m) of the Y-axis displacement sensor 6 for this point are recorded.

As shown in FIG. 1 to FIG. 4, the X-axis shifting platform 110 is kept still, the sliding block 111 of the X-axis shifting platform 110 is moved by a fixed distance Δ, and the coordinate optical speckle image $(I_p, I_q)_{2,\ 1\text{-}X\text{-}axis}$ (where p=1-n, and q=1-m) of the X-axis displacement sensor 8, the coordinate optical speckle image $(I_p, I_q)_{2,\ 1\text{-}Y\text{-}axis}$ (where p=1-n, and q=1-m) of the Y-axis displacement sensor 6, the height value $(h_{2,\ 1})$ of the Z-axis displacement sensor 7, the shift amount $x_2$ of the X-axis laser interferometer 3 and the shift amount $y_1$ ($y_1=0$ at this point in time) of the Y-axis laser interferometer 4 at this point in time are recorded. Summarizing the measurement results, at the position (2, 1) of the optical speckle image three-dimensional positioning base 1, the three-dimensional positioning coordinates $(x_2, 0, h_{2,\ 1})$, the coordinate optical speckle image $(I_p, I_q)_{2,\ 1\text{-}X\text{-}axis}$ (where p=1-n, and q=1-m) of the X-axis displacement sensor 8, and the coordinate optical speckle image $(I_p, I_q)_{2,\ 1\text{-}Y\text{-}axis}$ (where p=1-n, and q=1-m) of the Y-axis displacement sensor 6 for this point are recorded. Similarly, the X-axis shifting platform 110 is kept still, the sliding block 111 of the X-axis shifting platform 110 is moved for the $(u-1)^{th}$ time, and the coordinate optical speckle image $(I_p, I_q)_{u,\ 1\text{-}X\text{-}axis}$ (where p=1-n, and q=1-m) of the X-axis displacement sensor 8, the coordinate optical speckle image $(I_n, I_q)_{u,\ 1\text{-}Y\text{-}axis}$ (where p=1-n, and q=1-m) of the Y-axis displacement sensor 6, the height value $(h_{u,\ 1})$ of the Z-axis displacement sensor 7, the shift amount $x_u$ of the X-axis laser interferometer 3 and the shift amount $y_1$ ($y_1=0$ at this point in time) of the Y-axis laser interferometer 4 at this point in time are recorded. Summarizing the measurement results, at the position (u, 1) of the optical speckle image three-dimensional positioning base 1, the three-dimensional positioning coordinates $(x_u, 0, h_{u,\ 1})$, the coordinate optical speckle image $(I_p, I_q)_{u,\ 1\text{-}X\text{-}axis}$ (where p=1-n, and q=1-m) of the X-axis displacement sensor 8, and the coordinate optical speckle image $(I_p, I_q)_{u,\ 1\text{-}Y\text{-}axis}$ (where p=1-n, and q=1-m) of the Y-axis displacement sensor 6 for this point are recorded. Thus, the coordinate optical speckle images $(I_p, I_q)_{X\text{-}axis}, (I_p, I_q)_{Y\text{-}axis}$ and the three-dimensional positioning coordinates $(x_i, y_j, z_k)$ for the first row are built in the optical speckle coordinate database.

As shown in FIG. 1 to FIG. 4, positioning is performed by using the reading of the X-axis laser interferometer 3, the position of the sliding block 111 of the X-axis shifting platform 110 is returned to the origin (the reading of the position of the X-axis laser interferometer 3 is reset to zero), the Y-axis shifting platform 120 is fixed on the optical deck 101, and the X-axis shifting platform 110 is moved by a fixed distance Δ. The coordinate optical speckle image $(I_n, I_q)_{1,\ 2\text{-}X\text{-}axis}$ (where p=1-n, and q=1-m) of the X-axis displacement sensor 8, the coordinate optical speckle image $(I_p, I_q)_{1,\ 2\text{-}Y\text{-}axis}$ (where p=1-n, and q=1-m) of the Y-axis displacement sensor 6, the height value $(h_{1,\ 2})$ of the Z-axis displacement sensor 7, the shift amount $x_1$ ($x_1=0$ at this point in time) of the X-axis laser interferometer 3 and the shift amount $y_2$ of the Y-axis laser interferometer 4 at this point in time are recorded. Summarizing the measurement results, at the position (1, 2) of the optical speckle image three-dimensional positioning base 1, the three-dimensional positioning coordinates $(0, y_2, h_{1,\ 2})$, the coordinate optical speckle image $(I_p, I_q)_{1,\ 2\text{-}X\text{-}axis}$ (where p=1-n, and q=1-m) of the X-axis displacement sensor 8, and the coordinate optical speckle image $(I_p, I_q)_{1,\ 2\text{-}Y\text{-}axis}$ (where p=1-n, and q=1-m) of the Y-axis displacement sensor 6 for this point are recorded. The X-axis shifting platform 110 is kept still, the sliding block 111 of the X-axis shifting platform 110 is moved by a fixed distance Δ, and the coordinate optical speckle image $(I_p, I_q)_{2,2\text{-}X\text{-}axis}$ (where p=1-n, and q=1-m) of the X-axis displacement sensor 8, the coordinate optical speckle image $(I_p, I_q)_{2,\ 2\text{-}Y\text{-}axis}$ (where p=1-n, and q=1-m) of the Y-axis displacement sensor 6, the height value $(h_{2,\ 2})$ of the Z-axis displacement sensor 7, the shift amount $x_2$ of the X-axis laser interferometer 3 and the shift amount $y_2$ of the Y-axis laser interferometer 4 at this point in time are recorded. Summarizing the measurement results, at the position (2, 2) of the optical speckle image three-dimensional positioning base 1, the three-dimensional positioning coordinates $(x_2, y_2, h_{2,\ 2})$, the coordinate optical speckle image $(I_p, I_q)_{2,\ 2\text{-}X\text{-}axis}$ (where p=1-n, and q=1-m) of the X-axis displacement sensor 8, and the coordinate optical speckle image $(I_p, I_q)_{2,\ 2\text{-}Y\text{-}axis}$ (where p=1-n, and q=1-m) of the Y-axis displacement sensor 6 for this point are recorded. Similarly, the X-axis shifting platform 110 is kept still, the sliding block 111 of the X-axis shifting platform 110 is moved for the $(u-1)^{th}$ time, and the coordinate optical speckle image $(I_p, I_q)_{u,\ 2\text{-}X\text{-}axis}$ (where p=1-n, and q=1-m) of the X-axis displacement sensor 8, the coordinate optical speckle image $(I_p, I_q)_{u,\ 2\text{-}Y\text{-}axis}$ (where p=1-n, and q=1-m) of the Y-axis displacement sensor 6, the height value $(h_{u,\ 2})$ of the Z-axis displacement sensor 7, the shift amount $x_u$ of the X-axis laser interferometer 3 and the shift amount $y_2$ of the Y-axis laser interferometer 4 at this point in time are recorded. Summarizing the measurement results, at the position (u, 2) of the optical speckle image three-dimensional positioning base 1, the three-dimensional positioning coordinates $(x_u, y_2, h_{u,\ 2})$, the coordinate optical speckle image $(I_p, I_q)_{u,\ 2\text{-}X\text{-}axis}$ (where p=1-n, and q=1-m) of the X-axis displacement sensor 8, and the coordinate optical speckle image $(I_p, I_q)_{u,\ 2\text{-}Y\text{-}axis}$ (where p=1-n, and q=1-m) of the Y-axis displacement sensor 6 for this point are recorded. Thus, the coordinate optical speckle images $(I_p, I_q)_{X\text{-}axis}, (I_p, I_q)_{Y\text{-}axis}$ and the three-dimensional positioning coordinates $(xi, y_j, zk)$ for the second row are built in the optical speckle coordinate database.

As shown in FIG. 1 to FIG. 4, positioning is performed by using the reading of the X-axis laser interferometer 3, the position of the sliding block 111 of the X-axis shifting platform 110 is returned to the origin (the reading of the position of the X-axis laser interferometer 3 is reset to zero), and the X-axis shifting platform 110 is moved by a fixed distance Δ. The coordinate optical speckle image $(I_p, I_q)_{1,\ 3\text{-}X\text{-}axis}$ (where p=1-n, and q=1-m) of the X-axis displacement sensor 8, the coordinate optical speckle image $(I_p, I_q)_{1,\ 3\text{-}Y\text{-}axis}$ (where p=1-n, and q=1-m) of the Y-axis displacement sensor 6, the height value $(h_{1,\ 3})$ of the Z-axis displacement sensor 7, the shift amount $x_1$ ($x_1=0$ at this point in time) of the X-axis laser interferometer 3 and the shift amount $y_3$ of the Y-axis laser interferometer 4 at this point in time are recorded. Summarizing the measurement results, at the position (1, 3) of the optical speckle image three-dimensional positioning base 1, the three-dimensional positioning coordinates $(0, y_3, h_{1,\ 3})$, the coordinate optical speckle image $(I_p, I_q)_{1,\ 3\text{-}X\text{-}axis}$ (where p=1-n, and q=1-m) of the X-axis displacement sensor 8, and the coordinate optical speckle image $(I_p, I_q)_{1,\ 3\text{-}Y\text{-}axis}$ (where p=1-n, and q=1-m) of the Y-axis displacement sensor 6 for this point are recorded. Similarly, the X-axis shifting platform 110 is kept still, the sliding block 111 of the X-axis shifting platform 110 is moved for the $(u-1)^{th}$ time, and the coordinate optical speckle image $(I_p, I_q)_{u,\ 3\text{-}X\text{-}axis}$ (where p=1-n, and q=1-m) of the X-axis displacement sensor 8, the coordinate optical speckle image $(I_p, I_q)_{u,\ 3\text{-}Y\text{-}axis}$ (where p=1-n, and q=1-m) of the Y-axis displacement sensor 6, the height value $(h_{u,\ 3})$ of the Z-axis displacement sensor 7, the shift amount $x_u$ of the X-axis laser interferometer 3 and the shift amount $y_3$ of the Y-axis laser interferometer 4 at this point in time are recorded. Summarizing the measurement results, at the position (u, 3) of the optical speckle image three-dimensional positioning base 1, the three-dimensional positioning coordinates $(x_u, y_3, h_{u,\ 3})$, the coordinate optical speckle image $(I_p, I_q)_{u,\ 3\text{-}X\text{-}axis}$ (where p=1-n, and q=1-m) of the X-axis displacement sensor 8, and the coordinate optical speckle image $(I_p, I_q)_{u,\ 3\text{-}Y\text{-}axis}$ (where p=1-n, and q=1-m) of the Y-axis displacement sensor 6 for this point are recorded. Thus, the coordinate optical speckle images $(I_p, I_q)_{X\text{-}axis}$ and $(I_p, I_q)_{Y\text{-}axis}$ and the three-dimensional positioning coordinates $(x_i, y_j, z_k)$ for the third row are built in the optical speckle coordinate database.

Figure 3:
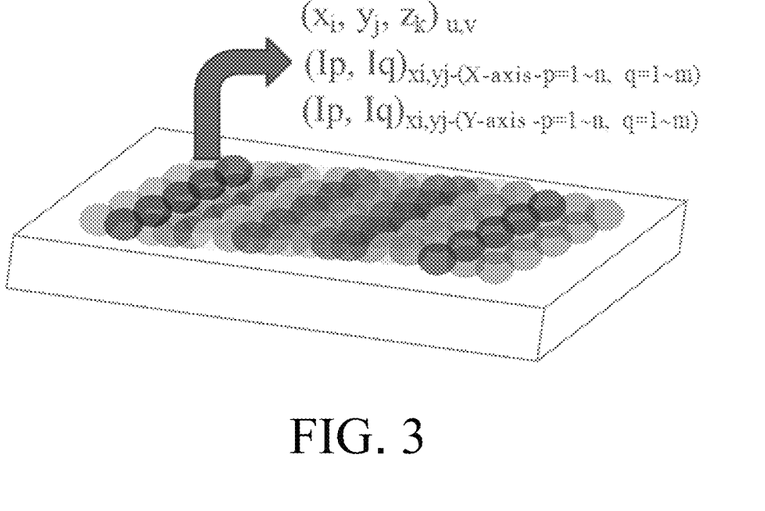
FIG. 3 is a diagram of an optical speckle coordinate database having X-axis optical speckle images, Y-axis coordinate images and the three-dimensional positioning coordinates and established on an optical speckle image three-dimensional positioning base of the present invention.

As shown in FIG. 1 to FIG. 4, similarly, the X-axis shifting platform 110 is moved for the $(v-1)^{th}$ time, the sliding block 111 of the X-axis shifting platform 110 is moved for the $(u-1)^{th}$ time, and the coordinate optical speckle image $(I_p, I_q)_{u,\ v\text{-}X\text{-}axis}$ (where p=1-n, and q=1-m) of the X-axis displacement sensor 8, the coordinate optical speckle image $(I_p, I_q)_{u,\ v\text{-}Y\text{-}axis}$ (where p=1-n, and q=1-m) of the Y-axis displacement sensor 6, the height value $(h_{u,\ v})$ of the Z-axis displacement sensor 7, the shift amount $x_u$ of the X-axis laser interferometer 3 and the shift amount $y_v$ of the Y-axis laser interferometer 4 at this point in time are recorded. Summarizing the measurement results, at the position (u, v) of the optical speckle image three-dimensional positioning base 1, the three-dimensional positioning coordinates $(x_u, y_v, h_{u,\ v})$, the coordinate optical speckle image $(I_p, I_q)_{u,\ v\text{-}X\text{-}axis}$ (where p=1-n, and q=1-m) of the X-axis displacement sensor 8, and the coordinate optical speckle image $(I_p, I_q)_{u,\ v\text{-}Y\text{-}axis}$ (where p=1-n, and q=1-m) of the Y-axis displacement sensor 6 for this point are recorded. Thus, the X-axis coordinate optical speckle image $(I_p, I_q)_{X\text{-}axis}$ and Y-axis coordinate optical speckle image $(I_p, I_q)_{Y\text{-}axis}$ and the three-dimensional positioning coordinates $(x_i, y_j, z_k)$ for the u×v array of the optical speckle image three-dimensional positioning base 1 are built in the optical speckle coordinate database. As shown in FIG. 3, the database of the X-axis coordinate optical speckle image $(I_p, I_q)_{X\text{-}axis}$, the Y-axis coordinate optical speckle image $(I_p, I_q)_{Y\text{-}axis}$ and the three-dimensional positioning coordinates $(x_i, x_j, z_k)$ is built on the granite three-dimensional positioning base, wherein each optical speckle positioning point (u, v) on the granite three-dimensional positioning base includes the positioning coordinates $(x_i, y_j, z_k)_{u,\ v}$, the X-axis coordinate optical speckle image $(I_p, I_q)$ v-X-axis (where p=1-n, and q=1-m) and the Y-axis coordinate optical speckle image $(I_p, I_q)_{u,\ v\text{-}Y\text{-}axis}$ (where p=1-n, and q=1-m).

In this embodiment, the X-axis displacement sensor 8, the Y-axis displacement sensor 6 and the Z-axis displacement sensor 7 on the optical speckle three-dimensional displacement sensor 2 all have certain measurement ranges in the Z-axis. If the distance from a measurement surface is too close or too far, the X-axis displacement sensor 8, the Y-axis displacement sensor 6 and the Z-axis displacement sensor 7 cannot measure or obtain correct displacement amounts. Since the optical speckle three-dimensional displacement sensor 2 installed above the optical speckle image three-dimensional positioning base 1 within a certain measurement height is capable of accurately and quickly obtaining three-dimensional absolute positioning coordinates of the optical speckle three-dimensional displacement sensor 2 relative to the optical speckle image three-dimensional positioning base 1, the three-dimensional space within the measurement height of the optical speckle three-dimensional displacement sensor 2 above the optical speckle image three-dimensional positioning base 1 may be defined as an optical speckle three-dimensional absolute positioning space. Provided that the optical speckle three-dimensional displacement sensor 2 is moved to being within the optical speckle three-dimensional absolute positioning space, the three-dimensional absolute positioning coordinates of the optical speckle three-dimensional displacement sensor 2 can be accurately and quickly obtained.

Figure 4:
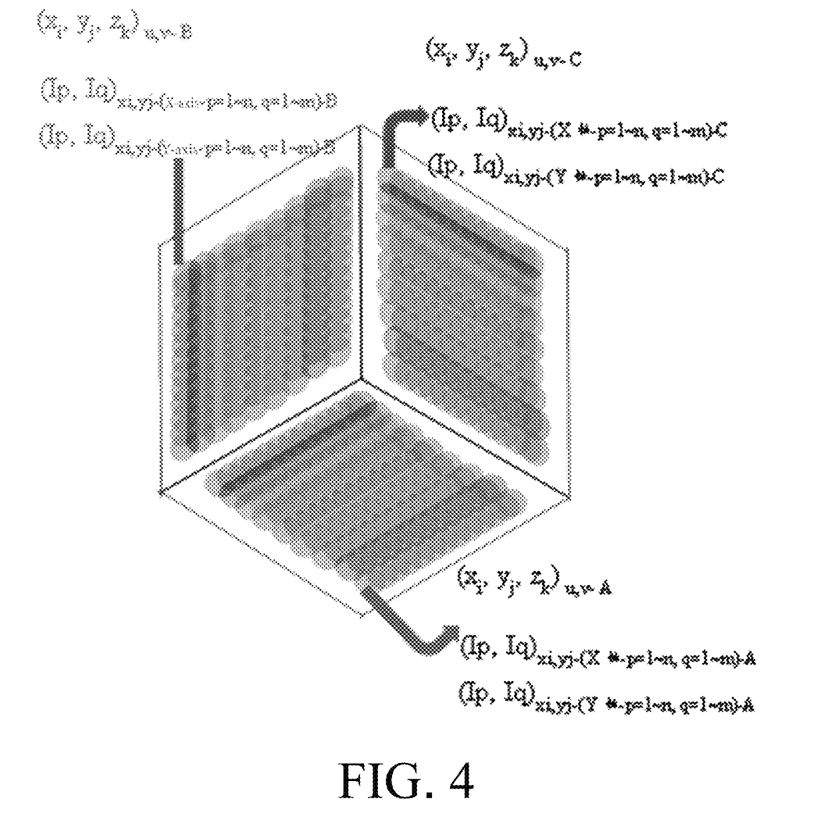
FIG. 4 is a schematic diagram of a robotic arm repeated positioning precision test platform of the present invention.

As shown in FIG. 3 to FIG. 8, the robotic arm repeated positioning precision test platform 200 is formed by three optical speckle image three-dimensional positioning bases 1 perpendicular to one another, wherein each of the optical speckle image three-dimensional positioning bases 1 is built with the optical speckle coordinate database. In this embodiment, the optical speckle image three-dimensional positioning bases 1 can be combined according to the needs for the performance test of the robotic arm. As shown in FIG. 4, three optical speckle image three-dimensional positioning bases 1 built with the optical speckle coordinate database having the positioning coordinates $(x_i, y_j, z_k)_{u,\ v}$, the X-axis coordinate optical speckle image $(I_p, I_q)_{u,\ v\text{-}X\text{-}axis}$ (where p=1-n, and q=1-m) and the Y-axis coordinate optical speckle image $(I_p, I_q)_{u,\ v\text{-}Y\text{-}axis}$ (where p=1-n, and q=1-m) are combined in a perpendicular manner into the robotic arm repeated positioning precision test platform 200. The robotic arm 20 installed with the optical speckle three-dimensional displacement sensor 2 is moved into the optical speckle three-dimensional absolute positioning space of a surface of any one of the three-dimensional positioning bases 1 of the test platform 200 to capture the X-axis optical speckle image, the Y-axis optical speckle image and the Z-axis real-time height. The X-axis and Y-axis optical speckle images are compared with the coordinate optical speckle image $(I_p, I_q)_{X\text{-}axis}$ and $(I_p, I_q)_{Y\text{-}axis}$ databases, and the three-dimensional absolute positioning coordinates of the end effector of the robotic arm relative to the optical speckle image three-dimensional positioning base 1 can then be obtained.

Figure 5:
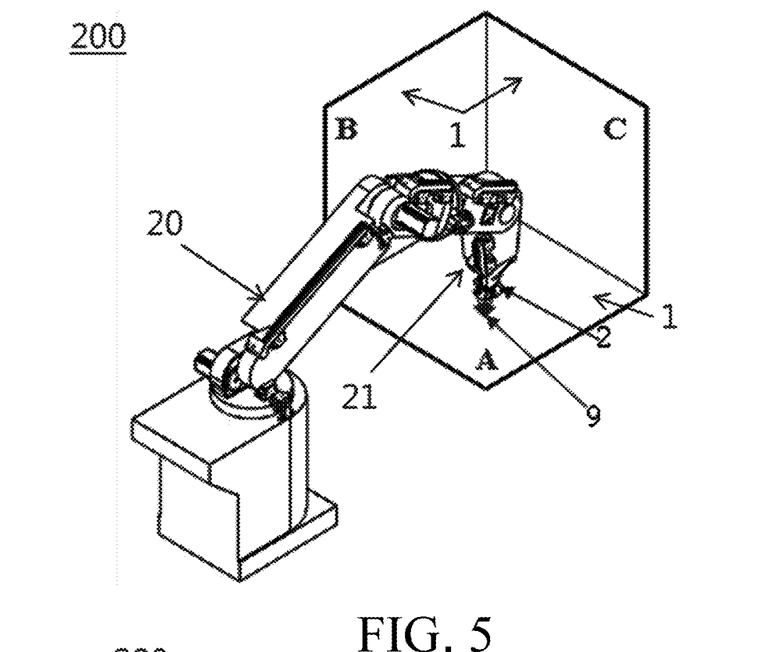
FIG. 5 is a schematic diagram of a robotic arm in an orientation relative to a test surface of a robotic arm repeated positioning precision test platform of the present invention.

More specifically, the surfaces of the three optical speckle image three-dimensional positioning bases 1 of the repeated positioning precision test platform for the robotic arm 20 are marked as three test surfaces including test surfaces A, B and C, wherein the test surfaces A, B and C are perpendicular to one another, as shown in FIG. 5. The optical speckle three-dimensional displacement sensor 2 is installed on the robotic arm end effector 21, the robotic arm 20 is moved to have the optical speckle three-dimensional displacement sensor 2 on the robotic arm end effector 21 enter the optical speckle three-dimensional absolute positioning space at the test surface A, the X-axis optical speckle image, the Y-axis optical speckle image and the Z-axis real-time height of the positioning point 9 are captured, the two real-time optical speckle images are compared with the corresponding optical speckle coordinate database to obtain the three-dimensional absolute positioning coordinates of the robotic arm end effector 21 relative to the optical speckle image three-dimensional positioning base 1 at the test surface A, and the rotation angle of each rotation axis and the three-dimensional absolute positioning coordinates of the robotic arm 20 relative to the optical speckle image three-dimensional positioning base 1 at the test surface A are recorded, hence completing the first round of positioning test on the robotic arm end effector 21. The robotic arm 20 is moved away or restored to the original position, and an instruction is issued to prompt each rotation axis of the robotic arm 20 to rotate to a test and recording angle sequentially. Once the robotic arm end effector 21 is positioned, the X-axis optical speckle image, the Y-axis optical speckle image and the Z-axis real-time height of the positioning point 9 are captured, and the two real-time optical speckle images are compared with the corresponding optical speckle coordinate database to obtain the second-round three-dimensional absolute positioning coordinates of the robotic arm end effector relative to the optical speckle image three-dimensional positioning base 1 at the test surface A. Similarly, the three-dimensional absolute positioning coordinates of the robotic arm end effector 21 relative to the optical speckle image three-dimensional positioning base 1 at the test surface A are obtained from executing n rounds of positioning, and the three-dimensional absolute positioning coordinate data of the n rounds is calculated to obtain related parameters of repeated positioning precision of the robotic arm 20 in an orientation relative to the test surface A.

Figure 6:
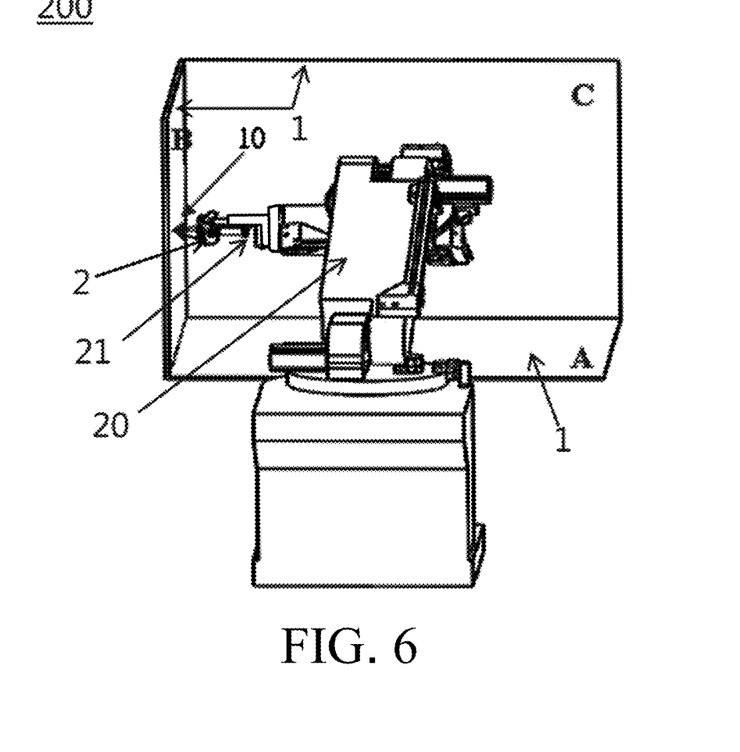
FIG. 6 is a schematic diagram of a robotic arm in an orientation relative to a test surface of a robotic arm repeated positioning precision test platform of the present invention.

Similarly, as shown in FIG. 6, the robotic arm end effector 21 is moved to enter the optical speckle three-dimensional absolute positioning space at the test surface B, the X-axis optical speckle image, the Y-axis optical speckle image and the Z-axis real-time height of the positioning point 10 are captured, the two real-time optical speckle images are compared with the corresponding optical speckle coordinate database to obtain the three-dimensional absolute positioning coordinates of the robotic arm end effector 21 relative to the optical speckle image three-dimensional positioning base 1 at the test surface B, and the rotation angle of each rotation axis and the three-dimensional absolute positioning coordinates of the robotic arm 20 relative to the optical speckle image three-dimensional positioning base 1 at the test surface B are recorded, the three-dimensional absolute positioning coordinates of the robotic arm end effector 21 relative to the optical speckle image three-dimensional positioning base 1 at the test surface B are obtained from executing n rounds of positioning, and the three-dimensional absolute positioning coordinate data of the n rounds is calculated to obtain related parameters of repeated positioning precision of the robotic arm 20 in an orientation relative to the test surface B.

Figure 7:
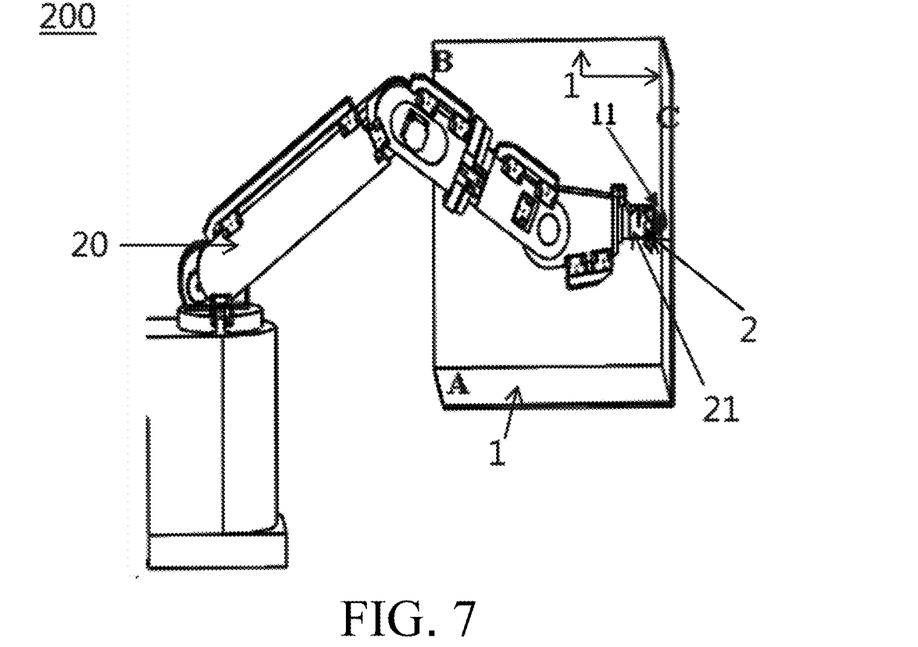
FIG. 7 is a schematic diagram of a robotic arm in an orientation relative to a test surface of a robotic arm repeated positioning precision test platform of the present invention.

Similarly, as shown in FIG. 7, the robotic arm end effector 21 is moved to enter the optical speckle three-dimensional absolute positioning space at the test surface C, the X-axis optical speckle image, the Y-axis optical speckle image and the Z-axis real-time height of the positioning point 11 are captured, the two real-time optical speckle images are compared with the corresponding optical speckle coordinate database to obtain in real time the three-dimensional absolute positioning coordinates of the robotic arm end effector 21 relative to the optical speckle image three-dimensional positioning base 1 at the test surface C, and the rotation angle of each rotation axis and the three-dimensional absolute positioning coordinates of the robotic arm 20 relative to the optical speckle image three-dimensional positioning base 1 at the test surface C are recorded, the three-dimensional absolute positioning coordinates of the robotic arm end effector 21 relative to the optical speckle image three-dimensional positioning base 1 at the test surface C are obtained from executing n rounds of positioning, and the three-dimensional absolute positioning coordinate data of the n rounds is calculated to obtain related parameters of repeated positioning precision of the robotic arm 20 in an orientation relative to the test surface C.

As described above, by moving the robotic arm 20 to have the optical speckle three-dimensional displacement sensor 2 enter the optical speckle three-dimensional absolute positioning space of the robotic arm repeated positioning precision test platform, the optical speckle images of the positioning points 9, 10 and 11 are captured and compared with the coordinate optical speckle images $(I_p, I_q)_{X\text{-}axis}$ and $(I_p, I_q)_{Y\text{-}axis}$ in the optical speckle coordinate database, so as to obtain the X-axis and Y-axis relative displacement amounts of the positioning points 9, 10 and 11 relative to the coordinate optical speckle images $(I_p, I_q)_{X\text{-}axis}$ and $(I_p, I_q)_{Y\text{-}axis}$. Further, in conjunction with the Z-axis height parameter of the optical speckle three-dimensional displacement sensor 2 and the three-dimensional positioning coordinates $(x_i, y_j, z_k)$ of the coordinate optical speckle images $(I_p, I_q)_{X\text{-}axis}$ and $(I_p, I_q)_{Y\text{-}axis}$, the current three-dimensional absolute positioning coordinates of the robotic arm end effector can be obtained.

Figure 8:
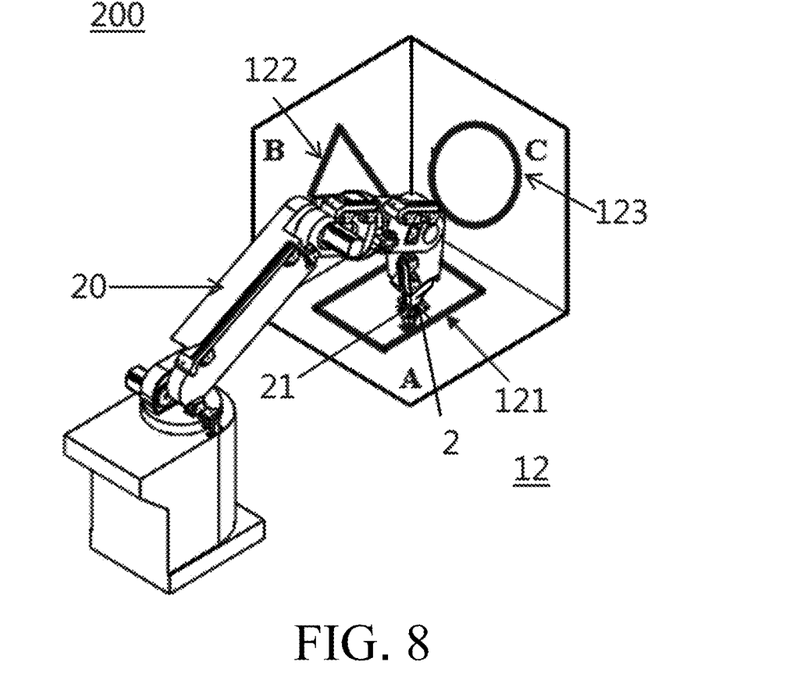
FIG. 8 is a schematic diagram of a positioning trajectory of a robotic arm, the positioning trajectory being within an optical speckle three-dimensional absolute positioning space of a robotic arm repeated positioning precision test platform at a test surface of the present invention.

It is clearly seen from FIG. 5 to FIG. 7 that the orientations of the robotic arm 20 at different positioning points 9, 10 and 11 in space are apparently different from one another, and the optical speckle three-dimensional absolute positioning space can satisfy repeated positioning precision test of various orientations of the robotic arm 20. In addition to being applicable to single-point repeated positioning precision testing in space, a positioning trajectory 12 of a continuous movement of the robotic arm 20 can also be used for executing repeated positioning precision test. As shown in FIG. 8, the optical speckle three-dimensional displacement sensor 2 clamped by the robotic arm end effector 21 draws a quadrilateral trajectory 121 within the optical speckle three-dimensional absolute positioning space of the optical speckle image three-dimensional positioning base 1 at the test surface A, draws a triangular trajectory 122 within the optical speckle three-dimensional absolute positioning space of the optical speckle image three-dimensional positioning base 1 at the test surface B, and draws a circular trajectory 123 within the optical speckle three-dimensional absolute positioning space of the optical speckle image three-dimensional positioning base 1 at the test surface C. Because the X-axis displacement sensor 8 and the Y-axis displacement sensor 6 of the optical speckle three-dimensional displacement sensor 2 are capable of continuous image capturing, comparison and positioning at a frequency of more than 10 kHz, and the Z-axis displacement sensor 7 is capable of continuous positioning at a frequency of 49 kHz, the robotic arm 20 that moves at a speed of 1 m/sec can be correctly positioned within the optical speckle absolute positioning space. Therefore, for any motion trajectories within the optical speckle absolute positioning space, the repeated positioning precision of the robotic arm 20 can be correctly measured.

Figure 9:
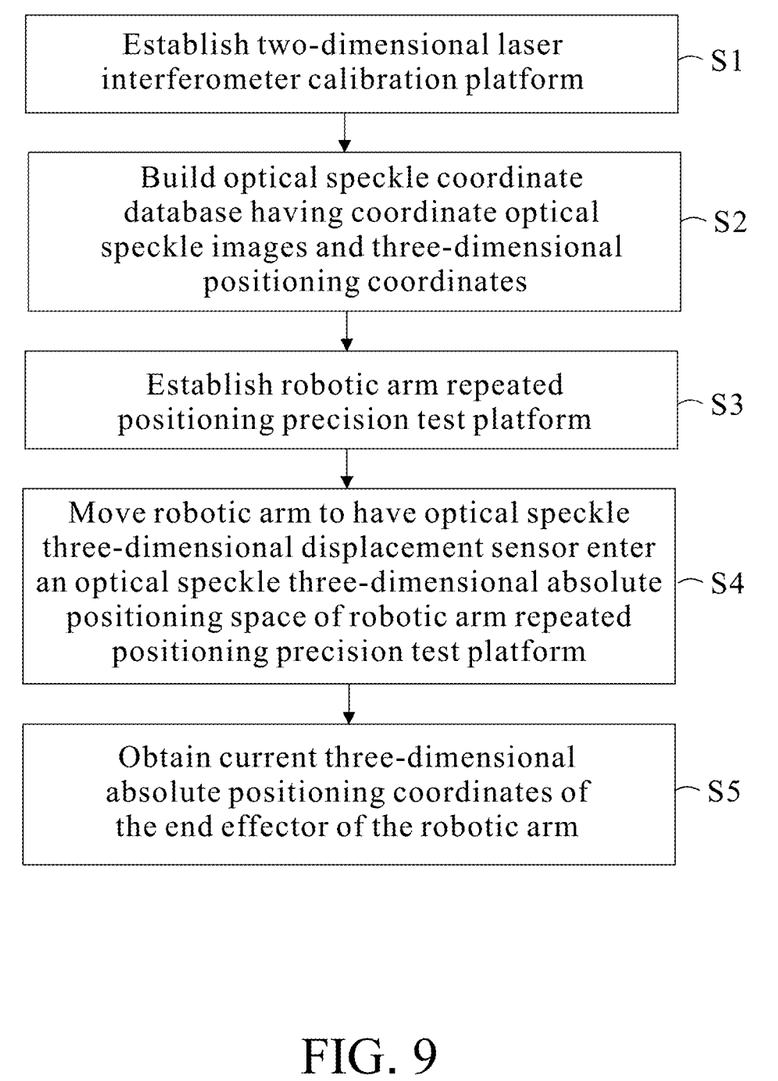
FIG. 9 is a flowchart of a method for measuring repeated positioning precision of a robotic arm of the present invention.

Referring to FIG. 9 showing a flowchart of a method for measuring repeated positioning precision of a robotic arm as well as FIG. 1 to FIG. 8, the method includes the following steps. In steps S1 and S2, a two-dimensional laser interferometer calibration platform is established, three laser beams from the optical speckle three-dimensional displacement sensor 2 are emitted to strike on the same position of the optical speckle image three-dimensional positioning base 1 to capture the optical speckle images and the height value of the position, and a optical speckle coordinate database having the positioning coordinates $(x_i, y_j, z_k)_{u, v}$, the X-axis coordinate optical speckle image $(I_p, I_q)_{u, v\text{-}X\text{-}axis}$ (where p=1-n, and q=1-m) and the Y-axis coordinate optical speckle image $(I_p, I_q)_{u, v\text{-}Y\text{-}axis}$ (where p=1-n, and q=1-m) is built from the two optical speckle images and the height value individually corresponding to a plurality of positions of the optical speckle image three-dimensional positioning base 1 stricken by the three laser beams of the optical speckle three-dimensional displacement sensor 2. In step S3, the robotic arm repeated positioning precision test platform 200 formed by three optical speckle image three-dimensional positioning bases 1 perpendicular to one another is established, wherein each of the optical speckle image three-dimensional positioning bases 1 is built with the optical speckle coordinate database. In steps S4 and S5, the optical speckle three-dimensional displacement sensor 2 is installed on the robotic arm end effector 21 of the robotic arm 20, the robotic arm 20 is moved to have the optical speckle three-dimensional displacement sensor 2 enter the optical speckle three-dimensional absolute positioning space of the robotic arm repeated positioning precision test platform 200, the optical speckle images of the positioning points 9, 10 and 11 are captured and compared with the coordinate optical speckle images $(I_p, I_q)_{X\text{-}axis}$ and $(I_p, I_q)_{Y\text{-}axis}$ in the optical speckle coordinate database to obtain the X-axis and Y-axis relative displacement amounts ($\Delta x, \Delta y$) of the positioning points 9, 10 and 11 relative to the coordinate optical speckle images $(I_p, I_q)_{X\text{-}axis}$ and $(I_p, I_q)_{Y\text{-}axis}$, and further in conjunction with the Z-axis height parameter ($\Delta Z$) of the optical speckle three-dimensional displacement sensor 2 and the three-dimensional positioning coordinates $(x_i, y_j, z_k)$ of the coordinate optical speckle images $(I_p, I_q)_{X\text{-}axis}$ and $(I_p, I_q)_{Y\text{-}axis}$, the current three-dimensional absolute positioning coordinates $(x_i+\Delta x, y_j+\Delta y, z_k+\Delta z)$ of the robotic arm end effector can be obtained.

In conclusion of the above, the most direct approach for boosting the value of robots is to improve the positioning precision of robotic arms. Using a device and a method for measuring repeated positioning precision of a robot disclosed by the present invention, in conjunction with the precision measurement positioning technique for multi-axes robotic arms developed by the inventor (refer to Taiwan Patent No. I 646,305, the U.S. Pat. No. 10,632,622 B2, and Japan Patent No. 2019-120967A), and from data such as precisely measured angle errors of rotation axes and deformation errors of robotic arms as well as measurement data of positioning errors of robotic arm end effectors, the development of a technique capable of precisely compensating positioning errors of robotic arms is promising, so as to effectively enhance the quality of domestically developed robots and achieving international and state-of-the-art standards. Thus, it is estimated that the technique of the present invention can bring related industries with revenues of several billions of dollars.

While the present disclosure has been described by means of specific embodiments, numerous modifications and variations could be made thereto by those skilled in the art without departing from the scope and spirit of the present disclosure set forth in the claims.

What is claimed is:

1. A device for measuring repeated positioning precision of a robotic arm, the device comprising:
   an optical speckle three-dimensional displacement sensor, having two image invariant optical speckle capturing devices perpendicular to each other and a laser displacement sensor;
   a two-dimensional laser interferometer calibration platform, having an optical speckle image three-dimensional positioning base and the optical speckle three-dimensional displacement sensor, the optical speckle three-dimensional displacement sensor configured to emit three laser beams striking on a same position of the optical speckle image three-dimensional positioning base to capture two optical speckle images and a height value of the position, and to build, from the two optical speckle images and the height value respectively corresponding to a plurality of positions of the optical speckle image three-dimensional positioning base stricken by the three laser beams of the optical speckle three-dimensional displacement sensor, an optical speckle coordinate database having two coordinate optical speckle images and a set of three-dimensional positioning coordinates;
   a robotic arm repeated positioning precision test platform, formed by three of the optical speckle image three-dimensional positioning bases perpendicular to one another, wherein each of the optical speckle image three-dimensional positioning bases is built with the optical speckle coordinate database; and
   a robotic arm, comprising an end effector, the end effector installed with the optical speckle three-dimensional displacement sensor;
   wherein, the robotic arm is moved to have the optical speckle three-dimensional displacement sensor enter an optical speckle three-dimensional absolute positioning space of the robotic arm repeated positioning precision test platform to capture an optical speckle image of a positioning point, the optical speckle image is compared with the coordinate optical speckle image in the optical speckle coordinate database to obtain X-axis and Y-axis relative displacement amounts of the positioning point relative to the coordinate optical speckle image, and further in conjunction with a Z-axis height parameter of the optical speckle three-dimensional displacement sensor and the three-dimensional positioning coordinates of the coordinate optical speckle image, current three-dimensional absolute positioning coordinates of the end effector of the robotic arm are obtained.

2. The device for measuring repeated positioning precision of a robotic arm according to claim 1, wherein each of the image invariant optical speckle capturing devices comprises an X-axis displacement sensor and a Y-axis displacement sensor, the X-axis displacement sensor measures a displacement amount in an X-axis direction for any point on an object surface, and the Y-axis displacement sensor measures a displacement amount in a Y-axis direction for any point on an object surface.

3. The device for measuring repeated positioning precision of a robotic arm according to claim 2, wherein the laser displacement sensor is a Z-axis displacement sensor, and comprises a laser confocal displacement sensor, a color confocal displacement sensor, a white light interference displacement sensor or a triangular measurement laser displacement sensor.

4. The device for measuring repeated positioning precision of a robotic arm according to claim 3, wherein all detection laser beams of the X-axis displacement sensor, the Y-axis displacement sensor and the Z-axis displacement sensor strike on a same point on a surface of the optical speckle image three-dimensional positioning base, operating wavelengths of the individual laser beams differ by at least 10 nm, and a ±5 nm interferometric filter is placed in front of a receiving lens of each of the displacement sensors to filter out scattered light of the remaining two laser beams so that the three laser beams do not interfere one another.

5. The device for measuring repeated positioning precision of a robotic arm according to claim 1, wherein the optical speckle three-dimensional absolute positioning space is above the optical speckle image three-dimensional positioning base, and in a three-dimensional space within a measurement height of the optical speckle three-dimensional displacement sensor.

6. The device for measuring repeated positioning precision of a robotic arm according to claim 1, wherein the optical speckle three-dimensional displacement sensor continuously captures images at a frequency of more than 10 kHz.

7. A method for measuring repeated positioning precision of a robotic arm, the method comprising:
(A) establishing a two-dimensional laser interferometer calibration platform, emitting three laser beams by an optical speckle three-dimensional displacement sensor to strike on a same position of an optical speckle image three-dimensional positioning base to capture two optical speckle images and a height value of the position, and building, from the two optical speckle images and the height value respectively corresponding to a plurality of positions of the optical speckle image three-dimensional positioning base stricken by the three laser beams of the optical speckle three-dimensional displacement sensor, an optical speckle coordinate database having two coordinate optical speckle images and a set of three-dimensional positioning coordinates;
(B) establishing a robotic arm repeated positioning precision test platform by means of forming the robotic arm repeated positioning precision test platform by three of the optical speckle image three-dimensional positioning bases perpendicular to one another, wherein each of the optical speckle image three-dimensional positioning bases is built with the optical speckle coordinate database;
(C) installing the optical speckle three-dimensional displacement sensor on an end effector of the robotic arm; and
(D) moving the robotic arm to have the optical speckle three-dimensional displacement sensor enter an optical speckle three-dimensional absolute positioning space of the robotic arm repeated positioning precision test platform to capture an optical speckle image of a positioning point, comparing the optical speckle image with the coordinate optical speckle image in the optical speckle coordinate database to obtain X-axis and Y-axis relative displacement amounts of the positioning point relative to the coordinate image, and further in conjunction with a Z-axis height parameter of the optical speckle three-dimensional displacement sensor and the three-dimensional positioning coordinates of the coordinate optical speckle image, obtaining current three-dimensional absolute positioning coordinates of the end effector of the robotic arm.

8. The method for measuring repeated positioning precision of a robotic arm according to claim 7, wherein the optical speckle three-dimensional displacement sensor comprises two image invariant optical speckle capturing devices perpendicular to each other and a laser displacement sensor, each of the image invariant optical speckle capturing devices comprises an X-axis displacement sensor and a Y-axis displacement sensor, the X-axis displacement sensor measures a displacement amount in an X-axis direction for any point on an object surface, and the Y-axis displacement sensor measures a displacement amount in a Y-axis direction for any point on an object surface.

9. The method for measuring repeated positioning precision of a robotic arm according to claim 8, wherein the laser displacement sensor is a Z-axis displacement sensor, and comprises a laser confocal displacement sensor, a color confocal displacement sensor, a white light interference displacement sensor or a triangular measurement laser displacement sensor.

10. The method for measuring repeated positioning precision of a robotic arm according to claim 9, wherein all detection laser beams of the X-axis displacement sensor, the Y-axis displacement sensor and the Z-axis displacement sensor strike on a same point on a surface of the optical speckle image three-dimensional positioning base, operating wavelengths of the individual laser beams differ by at least 10 nm, and a ±5 nm interferometric filter is placed in front of a receiving lens of each of the displacement sensors to filter out scattered light of the remaining two laser beams so that the three laser beams do not interfere one another.

\* \* \* \* \*